(12) United States Patent
Wu et al.

(10) Patent No.: US 8,305,199 B2
(45) Date of Patent: Nov. 6, 2012

(54) WIRELESS REMOTE CONTROL DEVICE

(75) Inventors: Yan-Hui Wu, Shenzhen (CN); Ya-Jun Pan, Shenzhen (CN); Song-Lin Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 310 days.

(21) Appl. No.: 12/817,991

(22) Filed: Jun. 17, 2010

(65) Prior Publication Data

US 2011/0254668 A1    Oct. 20, 2011

(30) Foreign Application Priority Data

Apr. 14, 2010   (CN) .......................... 2010 1 0146783

(51) Int. Cl.
*G08C 19/16* (2006.01)

(52) U.S. Cl. .................. 340/12.22; 340/12.54; 340/644; 340/517; 713/189; 341/176

(58) Field of Classification Search ...... 340/12.1–12.55, 340/517, 853.3, 644, 14.69, 4.11; 713/300; 341/176
See application file for complete search history.

(56) References Cited

U.S. PATENT DOCUMENTS

| | | | | |
|---|---|---|---|---|
| 4,912,463 A * | 3/1990 | Li | ................................ | 340/12.28 |
| 2002/0186203 A1* | 12/2002 | Huang | ........................... | 345/157 |
| 2003/0118187 A1* | 6/2003 | Fitzgibbon | .................. | 380/270 |
| 2003/0188172 A1* | 10/2003 | Yeh | ................................ | 713/189 |
| 2009/0300373 A1* | 12/2009 | Cui et al. | ...................... | 713/300 |

* cited by examiner

*Primary Examiner* — George Bugg
*Assistant Examiner* — Sharmin Akhter
(74) *Attorney, Agent, or Firm* — Altis Law Group, Inc.

(57) ABSTRACT

A wireless remote control device for controlling an electronic device includes a switch module, a wireless transmission module, a wireless receiving module and a control module. The switch module receives a DC voltage and outputs a first control signal. The wireless transmission module receives the first control signal and encodes the first control signal to output an encoded first control signal. The wireless receiving module receives the encoded first control signal and decodes the encoded first control signal to output a decoded first control signal. The control module receives the decoded first control signal and outputs a second control signal to turn on/off or reset the electronic device.

10 Claims, 5 Drawing Sheets

WIRELESS REMOTE CONTROL DEVICE

BACKGROUND

1. Technical Field

The present disclosure relates to a wireless remote control device for controlling an electronic device.

2. Description of Related Art

In computer systems such as personal computer (PC), operators usually need to press a power button to turn the computer system on or press a reset button to reset the computer, which is inconvenient when the operator is far from the PC.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
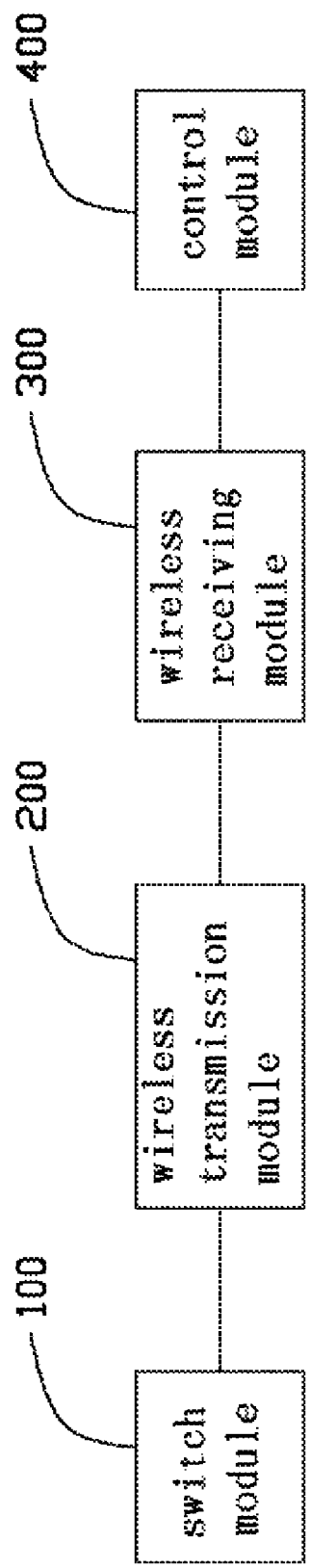
FIG. 1 is a block view of an embodiment of a wireless remote control device for controlling an electronic device.

Referring to FIG. 1, a wireless remote control device of an embodiment for controlling an electronic device (not shown) includes a switch module 100, a wireless transmission module 200, a wireless receiving module 300 and a control module 400. The switch module 100 receives a +5V DC and outputs a first control signal. The wireless transmission module 200 receives the first control signal and encodes the first control signal to output. The wireless receiving module 300 receives the encoded first control signal and decodes the encoded first control signal to output. The control module 400 receives the decoded first control signal and outputs a second control signal to turn on/off or reset the electronic device.

Figure 2:
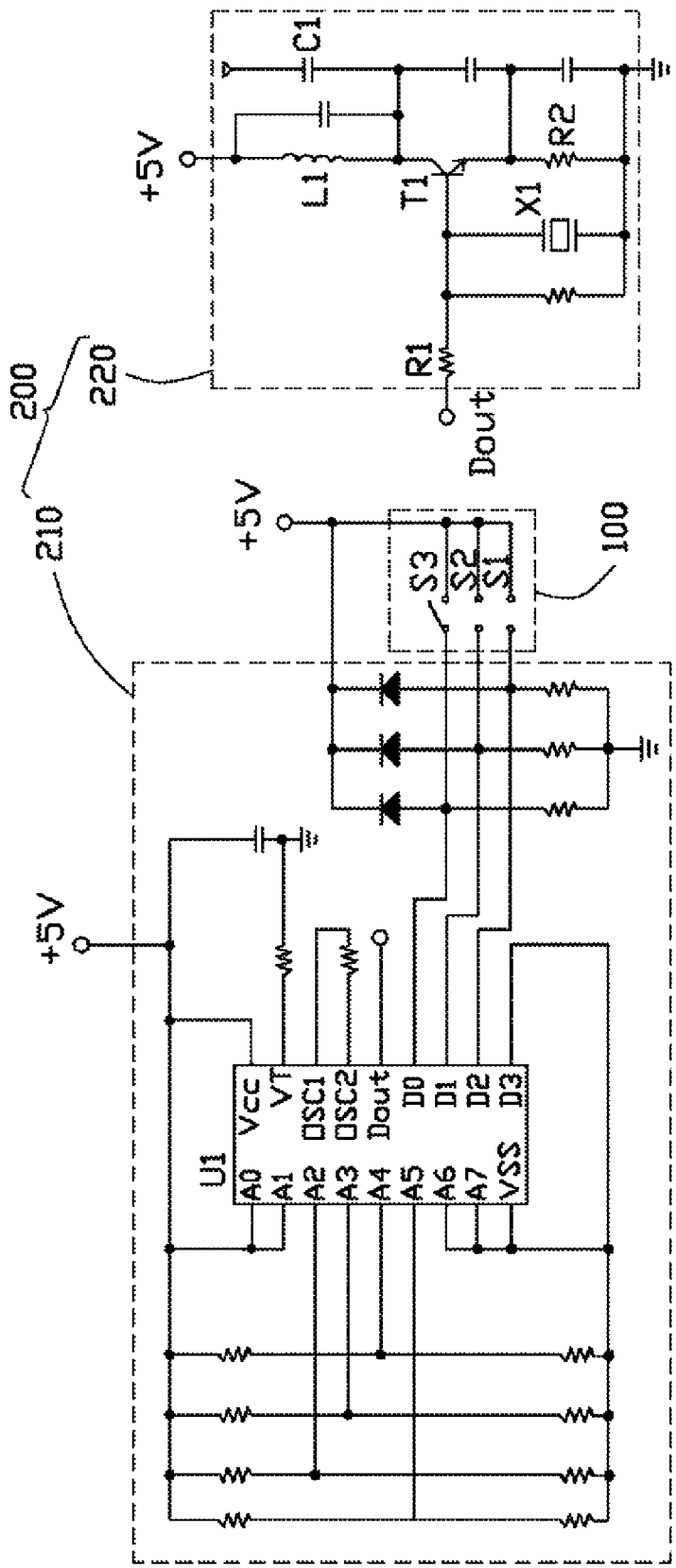
FIG. 2 is a circuit view of an embodiment of the switch module and the wireless transmission module.

Referring to FIG. 2, the switch module 100 includes switches S1~S3. The switches S1~S3 first terminals receives the +5V DC. The switches S1~S3 second terminals are electrically connected to the wireless transmission module 200 for outputting the first control signal. The wireless transmission module 200 includes an encoding circuit 210 and an oscillator transmission circuit 220. The encoding circuit 210 includes an encoding chip U1 having data pins D0~D2 and a code output pin Dout. The data pins D0~D2 receives the first control signal from the second terminals of the switches S1~S3 respectively. The encoding chip U1 encodes the first control signal which is output at the code output pin Dout. The oscillator transmission circuit 220 includes a transistor T1, resistors R1 and R2, a capacitor C1, an inductor L1 and a crystal oscillator X1. A transistor T1 base is electrically connected to the code output pin Dout via the resistor R1 for receiving the encoded first control signal. The transistor T1 base is grounded via the crystal oscillator X1. A transistor T1 emitter is grounded via the resistor R2. A transistor T1 collector receives the +5V DC via the inductor L1. The oscillator transmission circuit 220 mixes and oscillates the encoded first control signal which is output at the transistor T1 collector via the capacitor C1.

Figure 3:
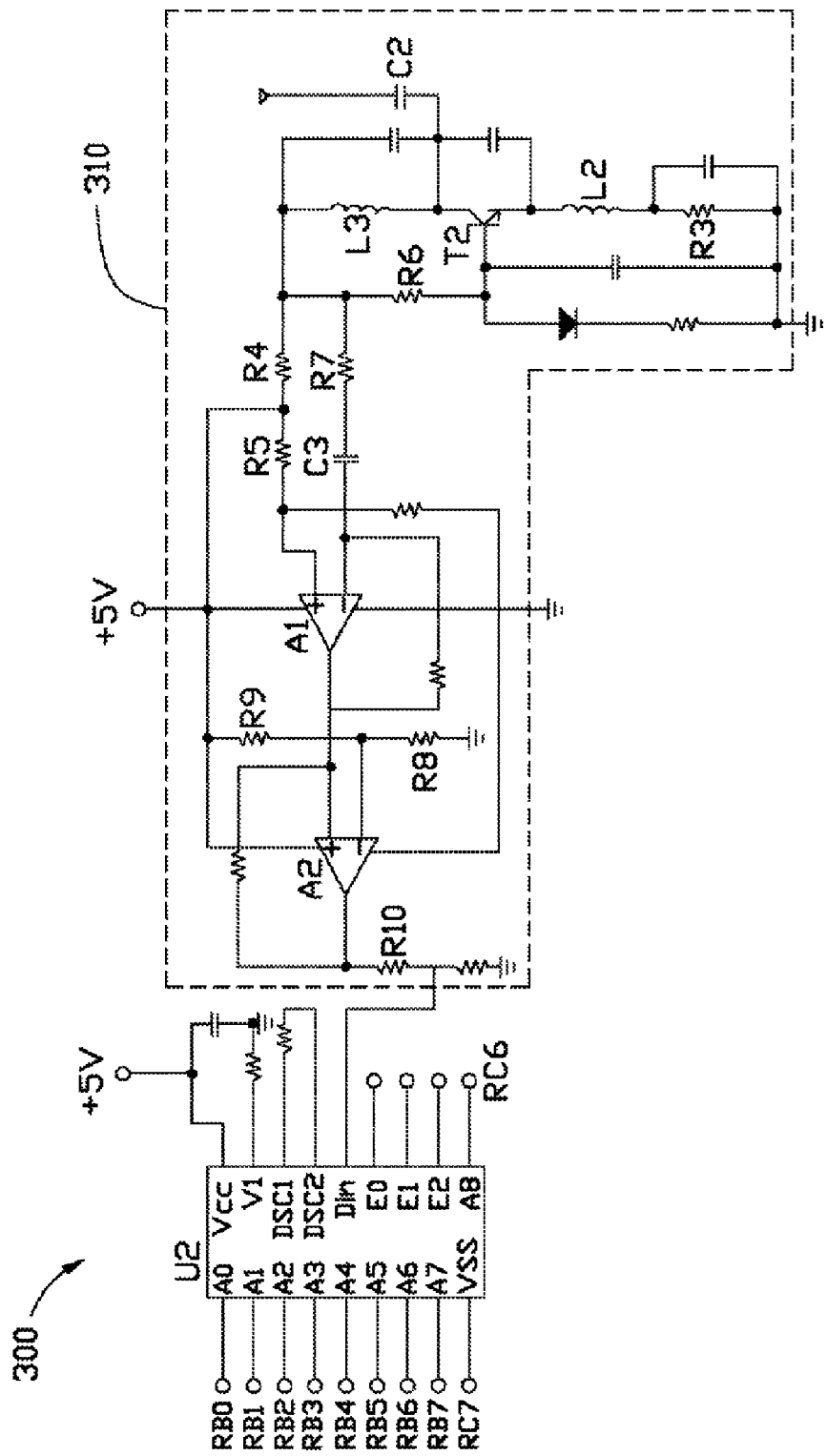
FIG. 3 is a circuit view of the switch module and the wireless transmission module of FIG. 1.

Referring to FIG. 3, the wireless receiving module 300 includes an amplifier circuit 310 and a decoding chip U2. The amplifier circuit 310 includes a transistor T2, resistors R3~R10, capacitors C2 and C3, inductors L2 and L3, and amplifiers A1 and A2. A transistor T2 collector is electrically connected to the transistor T1 collector via the capacitor C2 for receiving the encoded first control signal. A transistor T2 emitter is grounded via the inductor L2 and the resistor R3 connected in series. The transistor T2 collector receives the +5V DC via the inductor L3 and the resistor R4 connected in series. The transistor T2 collector is electrically connected to an amplifier A1 non-inverting input terminal via the inductor L3 and the resistor R5 in series. A transistor T2 base is electrically connected to the amplifier A1 non-inverting input terminal via the resistors R6, R4 and R5 in series. The transistor T2 base is electrically connected to an amplifier A1 inverting input terminal via the resistors R6 and R7 and the capacitor C3 in series. An amplifier A1 output terminal is electrically connected to an amplifier A2 non-inverting input terminal. An amplifier A2 inverting input terminal is grounded via the resistor R8, and is electrically connected to the transistor T2 base via the resistors R9, R4 and R6 in series. The amplifiers A1 and A2 amplify the encoded first control signal which is output at an output terminal of the amplifier A2 via the resistor R10. The decoding chip U2 includes a code input pin Din and data pins E0~E2. The code input pin Din is electrically connected to the output terminal of the amplifier A2 via the resistor R10 for receiving the encoded first control signal. The decoding chip U2 decodes the encoded first control signal which is output at the data pins E0~E2.

Figure 4:
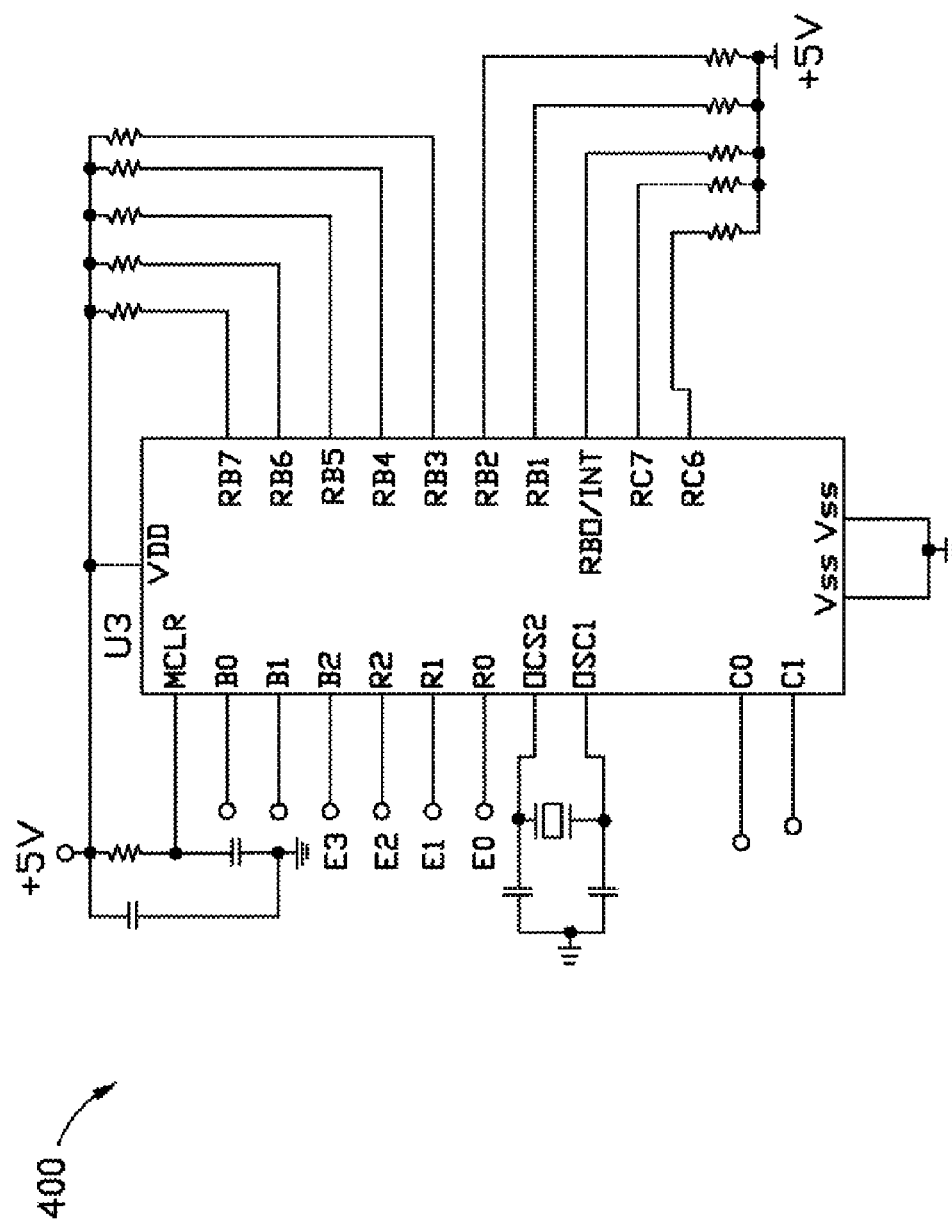
FIG. 4 is a circuit view of the switch module and the wireless transmission module of FIG. 1.
Figure 5:
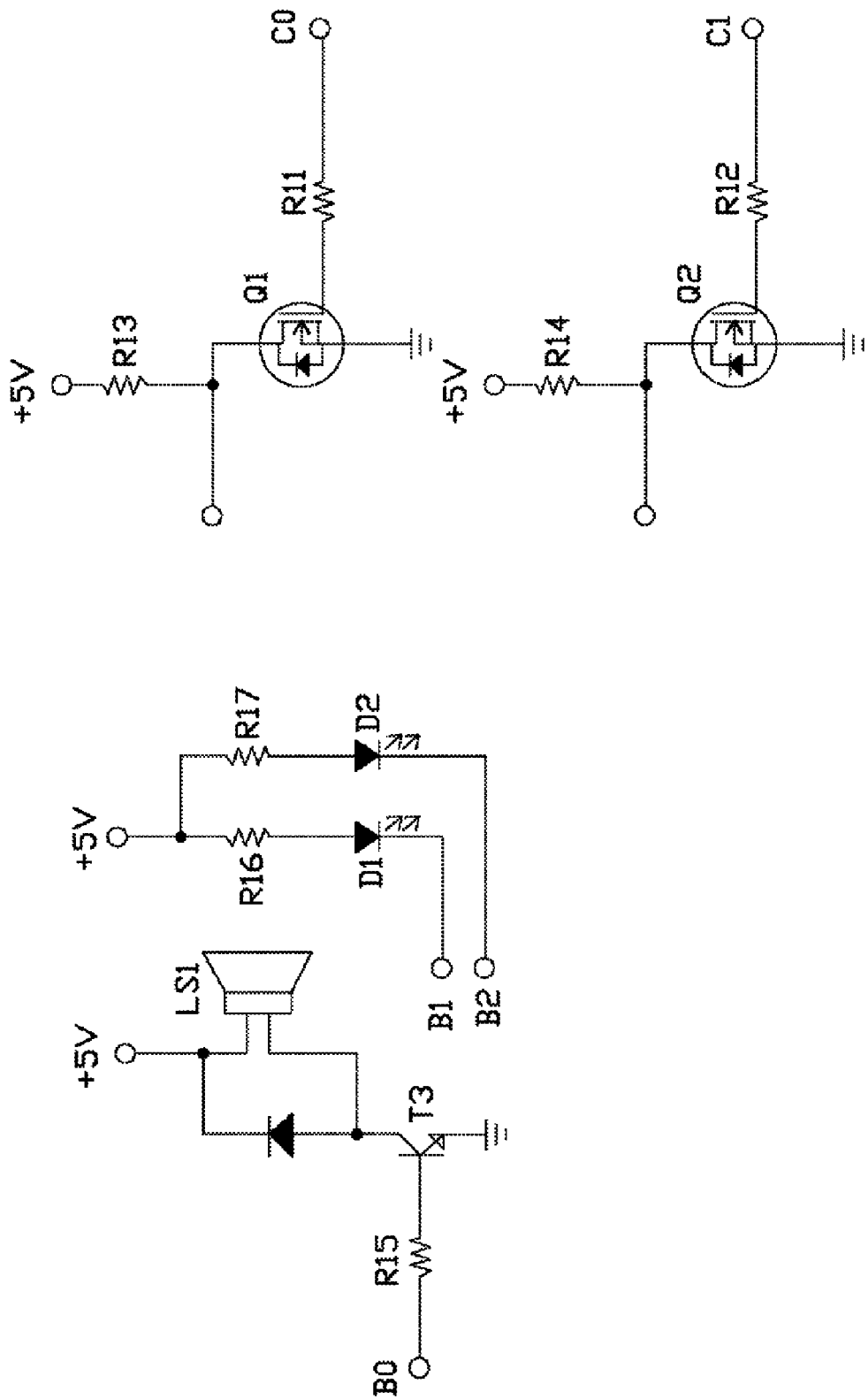
FIG. 5 is a circuit view of the switch module and the wireless transmission module of FIG. 1.

Referring to FIGS. 4 and 5, the control module 400 includes micro controller U3 and MOSFETs Q1 and Q2. The micro controller U3 includes data pins R0~R2, a power control signal output pin C0, a reset control signal output pin C1 and indication signal output pins B0~B2. The data pins R0~R2 are electrically connected to the data pins E0~E2 for receiving the decoded first control signal. The micro controller U3 outputs a second control signal at the power control signal output pin C0 or the reset control signal output pin C1 according to the decoded first control signal. The MOSFETs Q1 and Q2 grids are electrically connected to the power control signal output pin C0 and the reset control signal output pin C1 via the resistors R11 and R12 respectively for receiving the second control signal. The MOSFETs Q1 and Q2 sources are grounded. The MOSFETs Q1 and Q2 drains receive the +5V DC via the resistors R13 and R14 respectively.

The wireless remote control device further includes a transistor T3, a buzzer LS1, LEDs D1, D2 and resistors R15~R17. A transistor T3 base is electrically connected to the indication signal output pin B0 via the resistor R15 for receiving an indication signal. A transistor T3 emitter is grounded. A transistor T3 collector is electrically connected to a buzzer LS1 cathode. A buzzer LS1 anode receives the +5V DC voltage. The LEDs D1 and D2 cathodes are electrically connected to the indication signal output pins B1 and B2 respectively for receiving the indication signal. The LEDs D1 and D2 anodes receives the +5V DC voltage via the resistors R16 and R17 respectively. In one embodiment, the transistors T1~T3 are NPN type transistors. The MOSFETs Q1 and Q2 are N-channel MOSFETs. An oscillating frequency of the crystal oscillator X1 is 315 megahertz.

In use, the switches S1~S3 are pressed by an external force to turn on/off or reset the electronic device. When a corresponding switch is pressed, the corresponding data pin of the encoding chip U1 receives the +5V DC and is at a high voltage level. Assuming that logic 1 represents a high voltage level and logic 0 represents a low voltage level. In the practice, the switches S1~S3 may be arranged in a plurality of ways. The operation on the electronic device is indicated for each possible arrangement as follows:

| S1 | S2 | S3 | Logic Value | Electronic Device Operation |
|---|---|---|---|---|
| Not Pressed | Not Pressed | Not Pressed | 000 | Does Nothing |
| Not Pressed | Not Pressed | Pressed | 001 | Turns On |
| Not Pressed | Pressed | Not Pressed | 010 | Turns Off |
| Not Pressed | Pressed | Pressed | 011 | Rests |

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wireless remote control device for controlling an electronic device, comprising:
 a switch module capable of receiving a DC voltage and outputting a first control signal;
 a wireless transmission module capable of receiving the first control signal and encoding the first control signal to output an encoded first control signal;
 a wireless receiving module capable of receiving the encoded first control signal and decoding the encoded first control signal to output a decoded first control signal; and
 a control module capable of receiving the decoded first control signal and outputting a second control signal to turn on/off or reset the electronic device; wherein the switch module comprises a first switch and a second switch; the first and second switches first terminals are capable of receiving the DC voltage; and the first and second switches second terminals are electrically connected to the wireless transmission module to output the first control signal; the wireless transmission module comprises an encoding chip having a first data pin, a second data pin and a code output pin; the first and second data pins are capable of receiving the first control signal from the second terminals of the first and second switches; and the encoding chip is capable of encoding the first control signal which is output at the code output pin.

2. The wireless remote control device of claim 1, wherein the wireless transmission module further comprises an oscillator transmission circuit; the oscillator transmission circuit comprises a first transistor, a first inductor and a crystal oscillator; a first transistor base is electrically connected to the code output pin for receiving the encoded first control signal; the first transistor base is grounded via the crystal oscillator; a first transistor emitter is grounded; a first transistor collector is capable of receiving the DC voltage via the first inductor; and the oscillator transmission circuit is capable of mixing and oscillating the encoded first control signal which is output at the collector of the first transistor.

3. The wireless remote control device of claim 2, wherein the wireless receiving module comprises an amplifier circuit; the amplifier circuit comprises a second transistor, a second inductor, a third inductor, a first amplifier and a second amplifier; a second transistor collector is electrically connected to the first transistor collector for receiving the encoded first control signal; a second transistor emitter is grounded via the second inductor; the second transistor collector is capable of receiving the DC voltage via the third inductor and is electrically connected to a first amplifier non-inverting input terminal via the third inductor; and a second transistor base is electrically connected to the first amplifier non-inverting input terminal and a first amplifier inverting input terminal.

4. The wireless remote control device of claim 3, wherein a first amplifier output terminal is electrically connected to a second amplifier non-inverting input terminal; a second amplifier inverting input terminal is grounded and is electrically connected to the second transistor base; and the first and second amplifiers are capable of amplifying the encoded first control signal which is output at a second amplifier output terminal.

5. The wireless remote control device of claim 4, wherein the wireless receiving module further comprises a decoding chip having a code input pin, a third data pin and a fourth data pin; the code input pin is electrically connected to the second amplifier output terminal for receiving the encoded first control signal; and the decoding chip is capable of decoding the encoded first control signal which is output at the third and fourth data pins.

6. The wireless remote control device of claim 5, wherein the control module comprises a micro controller having a fifth data pin, a sixth data pin, a power control signal output pin and a reset control signal output pin; the fifth and sixth data pins are electrically connected to the third and fourth data pins respectively for receiving the decoded first control signal; and the micro controller is capable of outputting the second control signal at the power control signal output pin or the reset control signal output pin according to the decoded first control signal.

7. The wireless remote control device of claim 6, wherein the control module further comprises a first MOSFET and a second MOSFET; the first and second MOSFETs grids are electrically connected to the power control signal output pin and the reset control signal output pin respectively for receiving the second control signal; the first and second MOSFETs sources are grounded; the first and second MOSFETs drains are capable of receiving the DC voltage.

8. The wireless remote control device of claim 6, further comprising a third transistor and a buzzer; the micro controller further comprises a first indication signal output pin; a third transistor base is electrically connected to the first indication signal output pin for receiving an indication signal; a third transistor emitter is grounded; a third transistor collector is electrically connected to a buzzer cathode; a buzzer anode is capable of receiving the DC voltage; when the power control signal output pin outputs the second control signal, the electronic device turns on; and the third transistor base is capable of receiving the indication signal and driving the buzzer to alarm.

9. The wireless remote control device of claim 6, further comprising a first LED and a second LED; the micro controller further comprises a second indication signal output pin and a third indication signal output pin; the first and second LEDs cathodes are electrically connected to the second and third indication signal output pins for receiving indication signals; the first and second LEDs anodes are capable of receiving the DC voltage; when the power control signal output pin outputs the second control signal, the electronic device turns on; and the first and second LEDs are capable of emitting light.

10. A wireless remote control device for controlling an electronic device, comprising:
- a switch module capable of receiving a DC voltage and outputting a first control signal;
- a wireless transmission module capable of receiving the first control signal, encoding the first control signal, and output an encoded first control signal;
- a wireless receiving module capable of receiving the encoded first control signal, and decoding the encoded first control signal to output a decoded first control signal; and
- a control module, capable of receiving the decoded first control signal and outputting a second control signal to turn on/off or reset the electronic device, comprising:
    - a micro controller having a power control signal output pin and a reset control signal output pin;
    - a first MOSFET with a grid electrically connected to the power control signal output pin capable of receiving the second control signal; and
    - a second MOSFET with a grid electrically connected to the reset control signal output pin capable of receiving the second control signal.

\* \* \* \* \*